July 25, 1933.  W. F. BRANDT  1,919,768
SILENT CHAIN
Filed March 30, 1929  4 Sheets-Sheet 1

Fig. 1.

Inventor
William F. Brandt
by Parker & Carter
Attorneys.

July 25, 1933.   W. F. BRANDT   1,919,768
SILENT CHAIN
Filed March 30, 1929   4 Sheets-Sheet 2

Inventor
William F. Brandt
by Parker & Carter
Attorneys

July 25, 1933.    W. F. BRANDT    1,919,768
SILENT CHAIN
Filed March 30, 1929    4 Sheets-Sheet 3

Patented July 25, 1933

1,919,768

UNITED STATES PATENT OFFICE

WILLIAM F. BRANDT, OF INDIANAPOLIS, INDIANA, ASSIGNOR TO LINK-BELT COMPANY, OF CHICAGO, ILLINOIS, A CORPORATION OF ILLINOIS

SILENT CHAIN

Application filed March 30, 1929. Serial No. 351,199.

My invention relates to silent chain drives primarily of the inside contact type wherein each individual link making up the chain has two teeth, which lie astride of the sprocket tooth with which the link has driving connection, the link being in contact with only one side or one working face of that tooth.

Among the objects of my invention are to provide a chain sprocket drive which will be inexpensive in manufacture, silent, and wherein a substantially constant speed relation between the chain and the sprocket will prevail. Another object of my invention is so to relate the working faces of the chain teeth and sprocket teeth that the chain will enter and leave the sprocket substantially along a tangent to the pitch circle, thereby substantially avoiding longitudinal and transverse vibration of the chain. Another object of the invention is to provide a chain sprocket combination wherein the working surfaces on one are generated with respect to the working surfaces on the other, thus obtaining opposed working surfaces which are conjugate one to the other.

In general, I propose to generate the working surfaces of the chain tooth with respect to the various positions of an arbitrarily selected sprocket tooth, or to generate the working surfaces of the sprocket tooth with respect to the working surfaces of an arbitrarily selected chain tooth, so that as one rotates into and out of engagement with the other the surfaces are conjugate one to the other. The result is a chain drive having chain teeth and sprocket teeth in driving relation one with the other, wherein, instead of having two more or less flat surfaces moving into contact with one another along generally normal lines and thereby setting up vibration and noise by impact, I will have opposed curved surfaces coming into contact with one another with a combined rolling and sliding action.

This further results in a chain sprocket drive wherein, by the inter-relation between these conjugate surfaces, the chain tends to enter and leave contact with the sprocket along a line tangent to the pitch circle, instead of approaching along a line other than the tangent and seeking the pitch circle as contact takes place.

One of the undesirable characteristics of silent chain in use prior to my invention is known in the art as chordal action, and this is overcome by my invention. A chain which approaches a sprocket along a path other than the line tangent to the pitch circle is finally forced into general conformity with the pitch circle by contact with the sprocket teeth and the transverse movement of individual links resulting is transmitted to the approaching links, thus causing their path of approach to the sprocket to be a wave something like a sine wave. This chordal action gives the chain a varying linear velocity, together with transverse motion. Chordal action may be easier to visualize if we consider the reverse conditions of rolling a sprocket, which is equivalent to the pitch polygon, on a plane surface. The axis of the sprocket would then have the wave motion which is normally imparted to the chain. Mathematically the amplitude of the transverse motion of the earlier form of chain is equal to the versed sine of the angle 180° divided by number of teeth in the sprocket.

Chain made in accordance with my invention using conjugate working surfaces has none of these undesirable characteristics. Its entrance on to a sprocket is substantially along a line tangent to the pitch circle so that its linear velocity is uniform, and transverse motion is absent. Noise due to impact is therefore reduced and internal stresses set up in the links are reduced to a minimum.

I prefer to select arbitrarily a sprocket tooth profile and to generate the chain tooth profile to give the conjugate working surface relation, the reason for this being that sprocket profiles are very well established in the industry, and a chain generated as I propose to generate it will fit substantially all sprockets in use. But it will be understood that my invention is not limited to the generation of the chain tooth, as the same result may be obtained if the profile of the working surface of the chain tooth is arbitrarily selected and the sprocket tooth is generated to fit it.

To illustrate what I mean by generating the chain link tooth to give a conjugate working surface with respect to the arbitrarily selected sprocket tooth working surface, imagine a gear shaper with a cutter shaped exactly as the sprocket, the cutter reciprocating along its axis of rotation and rotating in unison with a lead strip fed tangentially to it and guided around it. If the linear velocity of the generating pitch line of the cutter be identical with that of the forward movement of the strip, and if the cutter reciprocates at a uniform rate, this cutter, as the strip of lead winds about it, will cut or generate tooth profiles in the lead strip as it enters on one side and as it leaves on the other, such tooth profiles on the strip being so related to the cutter that if the cutter drives an identical strip as a flexible rack, for that is what a silent chain is, there will be no appreciable chordal action and no effective differential speed between the chain and the cutter. This is so because, instead of each tooth picking up the load and pushing the chain forward and dropping the chain and leaving it for the next tooth to come on, the conjugate relation between the sprocket tooth and the chain tooth will result in giving the chain a substantially uniform forward movement substantially equivalent to the tangential speed of the gear at the pitch diameter. By conjugate surfaces, I mean tooth profiles which are of such form that one will drive the other with a constant velocity-ratio, that is, that the ratio of the angular velocity of the driver to that of the driven is constant.

The pitch circle may be defined as a function of the sprocket and the chain, and remains constant at all times for any given set of conditions. It is a circle whose center is the axis of rotation of the sprocket and whose periphery circumscribes a polygon whose sides are equal to the pitch of the chain and the number of whose sides equals the number of teeth in the sprocket. The pitch of the chain is the distance between pivot centers of the links. If the chain wears, or if it stretches under load or centrifugal force, the pitch increases, and the pitch circle increases in diameter. The change in the diameter of the pitch circle which results from wear is a gradual change extending throughout the life of the chain. The change in the pitch diameter resultant from load on the chain and from centrifugal force, remains constant or fixed for any given load and speed. There is no appreciable variation in the pitch circle diameter during operation and no fluctuation of the position of the pitch circle, along a tangent line to which the chain must enter and leave the sprocket during operation. As the pitch of the chain increases, the individual links ride farther out on the sprocket teeth. Thus the only result of an increase in the pitch or length of the chain is to cause the chain teeth to engage the sprocket teeth farther out from the center, without any other change in tooth relation.

If I use a chain link generated by a single tooth both on the entry and the leaving side of the sprocket, I get a tooth form generated without clearance, and under some circumstances this is undesirable. In order to give desirable manufacturing tolerances, and in order to make a chain which is easily assembled on the sprocket, I find it preferable, after the working surfaces have been generated, to slightly increase the distance between the inside working surfaces of the chain and to slightly increase the depth of the pocket between them without in any way changing the actual profile of the working surfaces.

For maximum accuracy of chain generation where a clearance is to be provided between the inside working surfaces of each chain link instead of merely increasing the distance between those working surfaces without changing the profile I may generate one of the working surfaces of each link without reference to the other and then afterwards generate the second working surface with reference to a center line spaced from the center line with reference to which the first working surface was generated by a distance equal to the amount of clearance desired. In other words in this case the profile of the working surface of one link tooth is generated independent of the profile of the working surface of the other tooth of the link and in such a way that there is a clearance between the profiles of the two opposed working surfaces of each chain tooth and the sprocket tooth which enters between them.

When my generated tooth approaches a sprocket tooth to which it is conjugate it is held up in position on the chain pitch line, which is the line tangent to the pitch circle, by contact with a sprocket tooth. If a non-generated chain tooth surface is used, that surface will either lie inside or outside of the profile of the generated surface. If it lies inside, the chain tooth will be so positioned as to locate the link pivot somewhere between the chain pitch line and the center of the sprocket at the time contact with the sprocket tooth is established. If the working surface lies outside the generated surface, the link pivot will be positioned somewhere beyond the tangent line when sprocket contact is established. In either event this results in displacing the link pivot at one side or other of the pitch circle and normal pitch line as the chain enters the sprocket and subsequently conforms to the pitch circle, thus the chordal action described above is set up. This same reasoning applies to the action of chain leaving a sprocket.

By working surfaces I mean those surfaces on the chain tooth and on the sprocket tooth which come together to establish a driving relation between chain and sprocket.
By inside contact I mean a chain and sprocket relation wherein the working surfaces on the chain are not at the ends of the link but form the sides of the gap or pocket between the two teeth on the link, and wherein, therefore, the working surfaces on any chain link are located not beyond the pivot points of the link but between the link pivot points.

My preferred form of link is, then an inside contact link wherein the relation between the width of the gap between the two link working surfaces and the sprocket tooth with which they cooperate is such that at points where contact between chain and sprockets can occur the distance between the opposed link working surfaces is greater than the distance between the working surfaces on the two sides of any individual sprocket tooth.
My invention is illustrated more or less diagrammatically in the accompanying drawings, wherein—

Like parts are indicated by like characters throughout the specification and drawings.
A is a driving gear or sprocket having teeth $A^1$. $A^2$ is the driven gear or sprocket having teeth $A^3$. Traveling about these two sprockets is a silent chain made up of a series of separate link members $A^5$, each having two chain teeth $A^6$ $A^7$ one at each end of the link. The interior opposed surfaces of these teeth are the working surfaces, the outer surfaces are cut away so that no matter what the position of the chain, they lie inside the contour of the interior working surfaces, and the interior working surfaces only are able to engage the sprocket teeth. These chain links are assembled into a chain belt by means of pivot pins $A^8$ upset at $A^9$ against holding washers $A^{10}$. I have shown for purposes of illustration only these pins as being solid, they might be built up, they might be hollow, their particular shape and arrangement is of no consequence in so far as my present invention is concerned, it being merely necessary that they join the separate chain links together in interlocking overlapping relation so as to provide a continuous chain belt which travels about the sprockets with the chain teeth engaging the sprocket tooth. The teeth on a plurality of links are in line to form in effect a series of composite teeth which engage a series of sprocket teeth in driving relation.

The relation between the chain teeth $A^6$ $A^7$ and the sprocket tooth $A^1$ or $A^3$ which enters between them is such that there is never a simultaneous contact between a sprocket tooth and the two chain teeth between which it enters but only contact between one side of the sprocket tooth and one of the interior working surfaces on the link, that is, there is never a simultaneous contact between a sprocket tooth and the working surfaces of two chain teeth on the same link.

Figure 1:
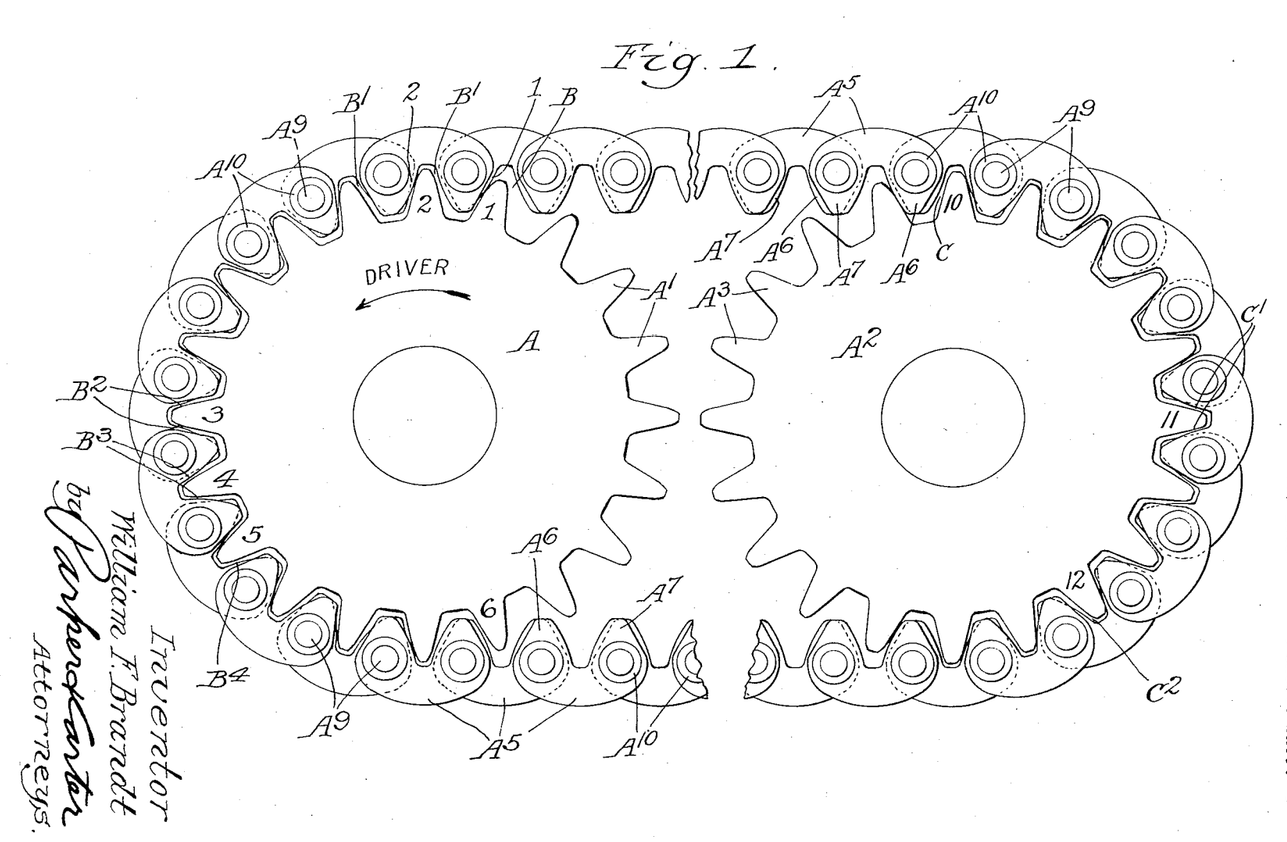
Figure 1 is a side view of a chain and sprocket assembly made in accordance with my invention, and showing the parts in the position which they would occupy when the chain is at work.

Referring now to Figure 1, the sprocket tooth which I have numbered 1 has just engaged the chain tooth 1 and there is a wide clearance B between the following tooth of that same link and the sprocket tooth. The sprocket tooth 2 has engaged the leading chain tooth 2 and there is a narrower clearance $B^1$ between the back of the sprocket tooth and the following tooth of the link. This narrower clearance $B^1$ persists as travel takes place around the sprocket with the sprocket tooth engaging the working surface on the back of the leading tooth of each chain link until some intermediate or transition point is reached as at 3 where there is a clearance $B^2$ between the sprocket tooth and both of the working faces on the chain teeth. This clearance is found also in connection with the next tooth 4. When tooth No. 5 however is reached the position of the clearance $B^4$ has moved and we now find that the sprocket tooth is in engagement with the working faces on the following chain tooth instead of the leading chain tooth and this continues until the position 6 is reached at which point the sprocket tooth is finally entirely out of contact with the chain and the chain is free to move away from the driving sprocket on its way to the driven sprocket, this side of the chain being the slack side as distinguished from the upper or incoming side which is the tight side.

The same general situation prevails in connection with the driven sprocket. As the chain leaves the driven sprocket starting with the sprocket tooth 10 we find that the leading chain tooth is spaced from the sprocket 10 by a clearance C, the following chain tooth being in contact with the sprocket tooth and this relation with the clearance between the leading side of the sprocket tooth and the working surfaces of the leading chain link prevails back as far as the transition point 11 where there is clearance $C^1$ on both sides of the sprocket tooth and no contact between it and either of the chain teeth. Beyond this point for instance at 12 the relation is reversed and the contact is between the sprocket tooth and the leading chain tooth with clearance at $C^2$. This condition prevails throughout the remainder of the area of contact between the chain and sprocket.

It may even occur that there will be no such floating link and no place where there is a clearance between the sprocket tooth and the two link teeth with which it is associated. In such case there is contact on one side with one link and then contact on the other side with another link without the intermediate floating chain link. This depends on the pitch relation between the chain and sprocket. Also depending upon the pitch relation between the chain and the sprocket, the angular position of the transition point varies through a fairly wide range within the total angle of contact between sprocket and chain.

Figure 2:
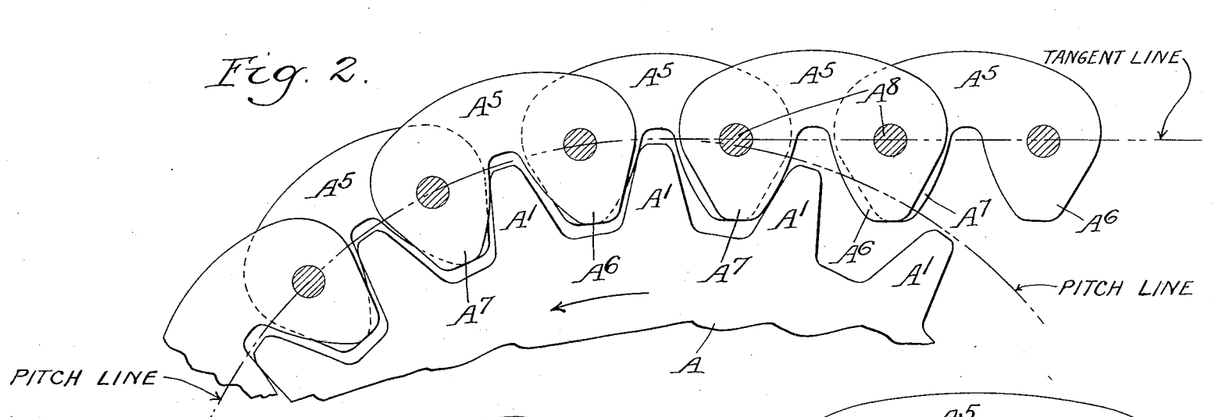
Figure 2 is a detail enlarged longitudinal section showing the chain and sprocket relation on the incoming side.
Figure 3:
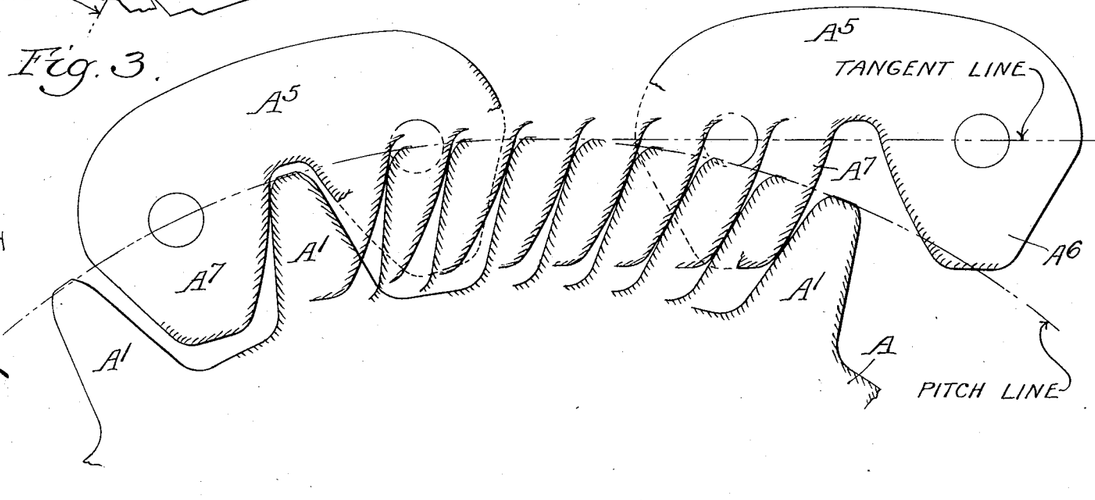
Figure 3 is a diagrammatic view showing the tooth action.
Figure 4:
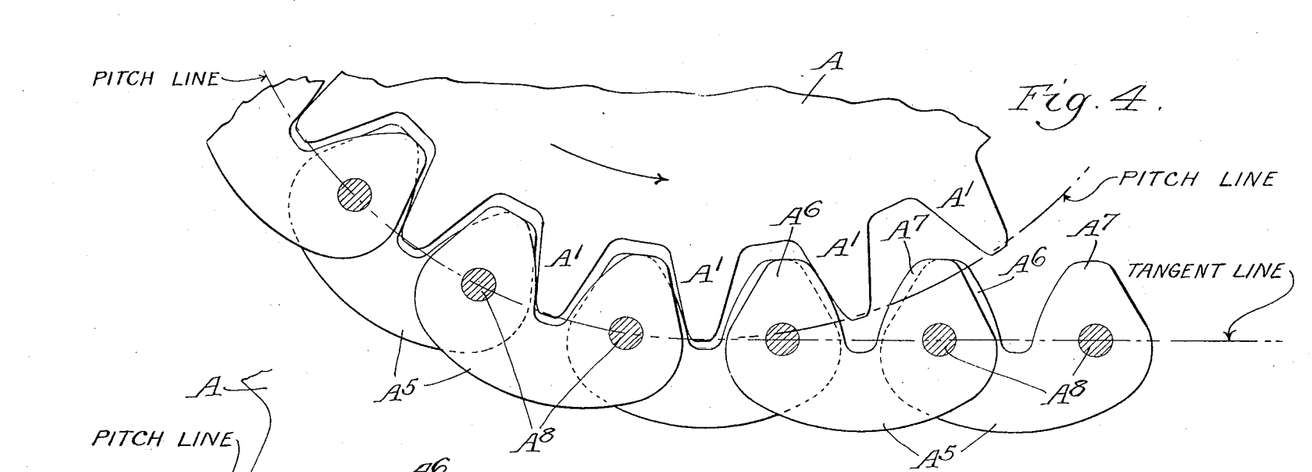
Figure 4 is a detail similar to Figure 2 on the outgoing side;
Figure 5:
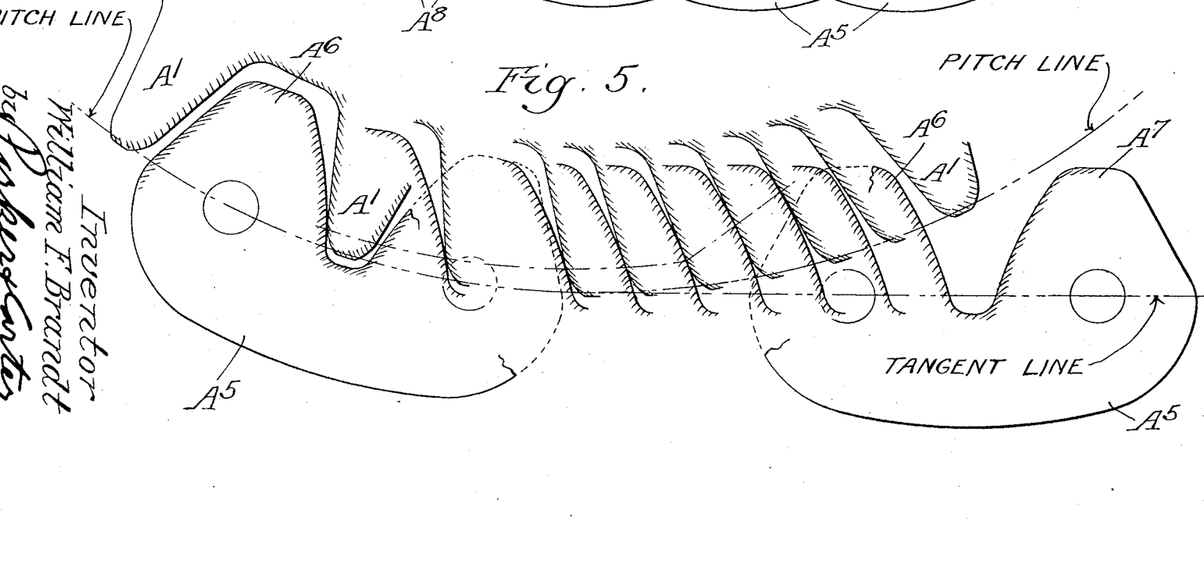
Figure 5 is a diagrammatic view similar to Figure 3 on the outgoing side.
Figure 6:
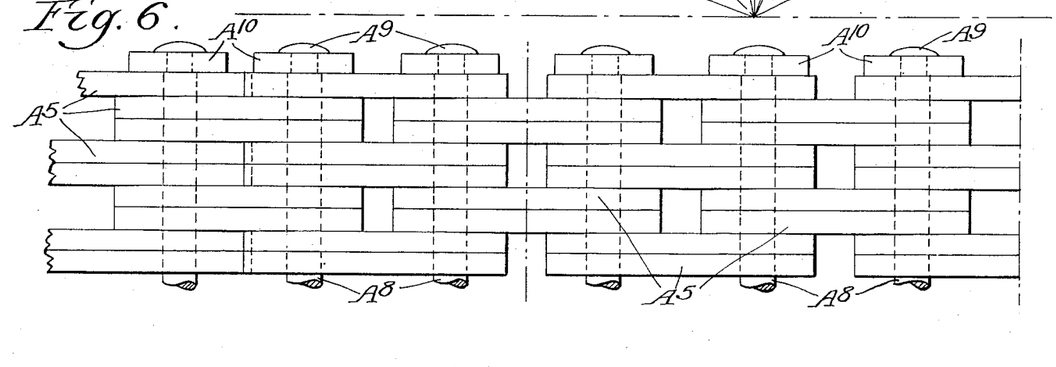
Figure 6 is a plan view of the portion of the chain shown in Figures 2 and 5.

Referring now to Figures 2 and 3, there is illustrated on a larger scale the relation between the sprocket and the chain as the chain winds about the driver. It will be noted that in the initial position toward the right there is contact between the working face of the chain tooth toward its point and the forward working face of the sprocket tooth toward its base. As these two teeth roll and slide together as indicated diagrammatically in Figure 3, the line of contact moves outwardly from the center of rotation of the sprocket until on the extreme left of Figure 3 the driving sprocket tooth toward its point engages the chain tooth toward its base. In Figures 4 and 5, the same thing is shown as applied to the leaving side of the driving sprocket. Here the slack chain as it leaves the sprocket is held back by the sprocket and so there is a contact between the following side of the sprocket tooth and the following chain link tooth as contrasted with the contact between the leading side of the sprocket tooth and the leading chain tooth in Figures 2 and 3. The same sliding and rolling action occurs so that the contact between the chain and sprocket teeth travels inwardly as the chain leaves the sprocket from the left hand position with contact between the top of the sprocket tooth and the base of the chain tooth to contact between the tip of the chain tooth and the base of the sprocket tooth, the displacement of this line of contact being along the dot and dash line as indicated.

The same relation prevails both with the driving and with the driven sprocket chain. If we regard the sprocket as being driven, then the chain of Figure 4 instead of being the slack side will be the tight side and the chain of Figure 2, instead of being the tight will be the slack side of the chain but the relation between the teeth on sprocket and chain would be the same in each case.

The use and operation of my invention are as follows:

All silent chains heretofore made in accordance with prior practice, while they may differ widely as to link profile, have in common a certain undesirable characteristic action on the sprocket wheel known as chordal action or the variable directions and velocities of the link in changing from linear to angular motion, which results in noise, undue stress in the links, and irregularity or roughness in the chain operation.

In a drafting room method for determining the form of arc generated between the pin centers of a link by a given sprocket tooth form, there may be an arbitrary selection of 1. The pitch of the chain; 2. The diameter of the pitch circle of the chain on the sprockets; 3. The tooth form of the sprocket wheel; 4. The outside diameter of the sprocket.

As a basis for the generating process, the following conditions desired in the resulting chain are assumed:

1. Constant angular velocity in the sprocket combined with constant linear velocity in the chain entering the sprocket, the velocity of the chain being equal to the linear velocity of a point on a sprocket tooth (extended if necessary) which lies on the pitch circle.

2. The points of articulation or pin centers of the assembled chain shall enter the sprocket on a line tangent to the pitch circle of the chain on the generating sprocket.

Figures 7, 8:
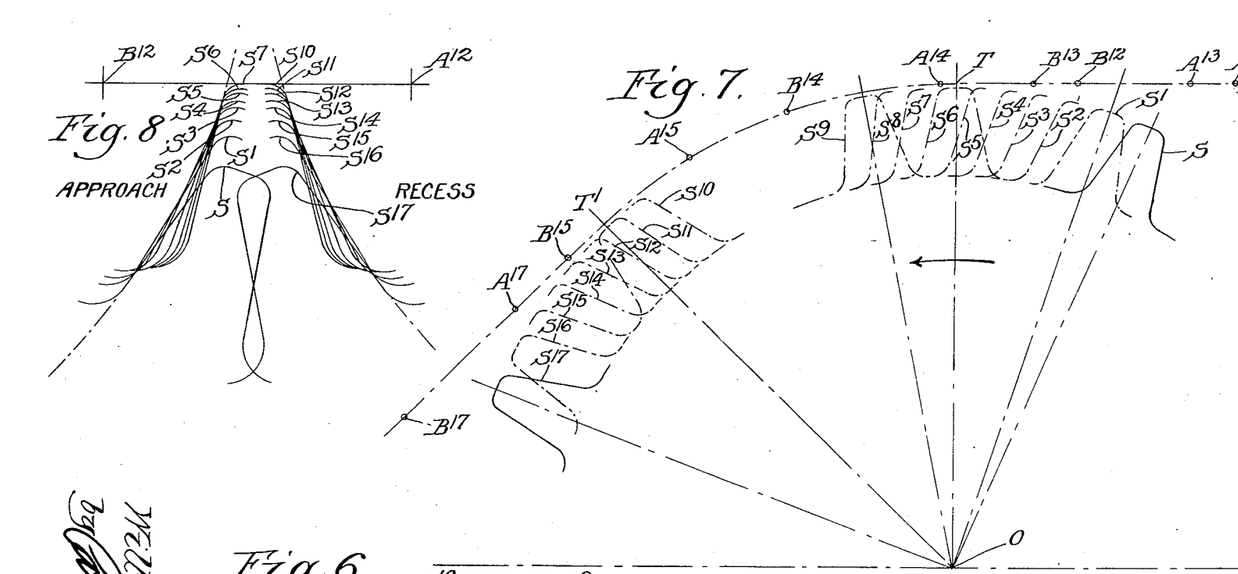
Figures 7 and 8 are diagrammatic views illustrating a method of determining the generated tooth form or profile.

One method of procedure to obtain the desired tooth profile may be as follows:

Select arbitrarily a sprocket of any convenient size or given pitch and number of teeth with a definite form of teeth as shown at S in Figure 7. Draw an arc of the pitch circle of the sprocket as $A^{14}$ $B^{14}$ $A^{15}$ $T^1$ of any convenient length. Draw the straight line T $B^{13}$ $B^{12}$ $A^{13}$ $A^{12}$ tangent to the arc of the pitch circle of the sprocket to represent the pitch line of the chain as it approaches the sprocket. Also draw the straight line $T^1$ $B^{15}$ $A^{17}$ $B^{17}$ tangent to the arc of the pitch circle of the sprocket to represent the pitch line of the chain during recession from the sprocket.

On thin transparent celluloid or tracing paper mark two points spaced apart a distance equal to the pitch of the assembled chain. Call these points of articulation $A^{12}$ and $B^{12}$. Place the points $A^{12}$ and $B^{12}$ of the transparent sheet on the pitch line of approach $A^{12}$ $A^{13}$ $B^{12}$ $B^{13}$ in some relative position to the first engaging tooth of the sprocket as S. The relation of the points $A^{12}$ and $B^{12}$ to the profile S of the tooth may be taken arbitrarily and conjugate profiles made for the relation assumed, but a preferred location of $A^{12}$ and $B^{12}$ relative to profile S is such as to make the tooth profiles symmetrical to $A^{12}$ and $B^{12}$, as shown. Having located the link and tooth relation for the first tooth engaged, the profile S of the tooth is traced on the transparent sheet.

The next step in the procedure is to move the transparent sheet a small distance toward the sprocket with points $A^{12}$ and $B^{12}$ always lying on the pitch line and consider that the sprocket turns through an angle such that the linear displacement of the chain corresponding to the angular displacement of the sprocket gives uniform motions for both. This position mentioned is shown as $S^1$ for the tooth profile $A^{13}$ and $B^{13}$ for the position of the articulation points of the link. The profile $S^1$ is then traced on the transparent sheet as before.

As the link approaches the point of tangency T, Figure 7, the point $B^{12}$ of the link follows the pitch circle of the sprocket as at $B^{14}$ and the profile of the link is modified accordingly.

The link profile for the side of recession of the link is drawn in a similar manner. The points $A^{12}$ and $B^{12}$ follow the pitch circle of the sprocket in the same direction as during the approach to the point of tangency of the pitch line of recession, then follow the pitch line of recession. The development of the profile of recess is from the root of the link tooth to the point, which is the reverse procedure of the development of the approach profile.

Now draw on the transparent sheet a line tangent to all the tracings of the given tooth for the entering action and a second line tangent to all the tracings of the given tooth for the recession action. Figure 8 shows the complete double profile of the engaging parts of the link. These curves are the required outlines for the contact surfaces of the link to be designed and will be in correct relation on the transparent sheet to the pin centers marked thereon. The remainder of the link outline may be drawn as desired with due regard to clearances and to strength factors and may take, for example, the form illustrated in Figures 1, 2 and 3.

Obviously the same result may be obtained on a single sheet of drawing paper by superimposing the tooth positions upon one another and drawing the curve tangent to all of those outlines. In any case, care must be used to consider the varying angle that the pitch chord, i. e., the straight line connecting adjacent points of articulation of the chain when wrapped around the sprocket wheel, makes with the tangent to the pitch circle as the chain link tilts into position of full chain wrap around the sprocket.

The curves for the contact surface or surfaces of a link obtained as described are conjugate to the original tooth form and the links have with the sprocket teeth the characteristic progressive rolling and sliding action which affords the desired constant velocity conditions in both the driven and driving elements. The desired conditions for ideal drive assumed as a basis for the process of generation are thus reproduced when a chain composed of links designed after the manner described operates on sprockets having teeth of the form used for generation.

Chain and sprocket combinations made in accordance with this invention have certain highly desirable characteristics. Chordal action is practically eliminated, and the chain enters the sprocket with constant linear velocity for any given constant angular velocity of the sprocket. The pins are permitted no deviation from the pitch line on entering the sprocket by reason of the aforesaid progressive contact action and the engaging action of adjacent chain links with succeeding sprocket teeth is an overlapping one in which each link while on the pitch line has initial contact with a sprocket tooth prior to assumption by the link of driving or driven load. This will be apparent from Figure 2, which shows clearly how the contact between the surfaces of link and sprocket teeth holds the entering chain link in a position such that the points of articulation enter the sprocket on a line tangent to the pitch circle. Elimination of chordal action results in a material reduction of the stresses set up in the link structure, affords extreme smoothness in operation, and largely reduces noise.

Another important characteristic of this chain and sprocket assembly resides in the fact that impact between the links and sprocket upon engagement is eliminated. This is due to the conjugate character of the contacting surfaces. With such surfaces, when the link enters the sprocket, the paths traced by the contact points on both link and sprocket tooth are practically coincident, and the initial contact is accordingly gradual and gentle and entirely lacking in impact characteristics.

The nature of the contacting surfaces is also responsible for another desirable characteristic materially and favorably affecting the running and wearing characteristics, as well as the manufacture. The contact surface of the link is of such a form that regardless of what portion thereof may be used within lengths practical for the link construction, the action between the link and sprocket tooth remains the same. Elongation due to wear in the joints or from other causes, therefore, has practically no effect upon the action of engagement and disengagement of the link and sprocket teeth. Also the chain is not sensitive to minor variations and inaccuracies in manufacture.

In silent chain of prior design and manufacture, articulation of the leading entering link pivot takes place before contact of the link with the sprocket tooth is established. A distinctive feature of the chain herein described lies in the fact that tooth contact is established at the same time or before articulation of the first entering pivot takes place.

The method described above produces a generated curve form in the arc of the link between the points of articulation of the latter. Similarly, a given link form may be used to obtain a conjugate form of sprocket tooth. In either case, the novel process of obtaining the contact surfaces that will be conjugate for chain and sprocket relation applies. Furthermore, it is possible to generate the outside faces of a link tooth if desired.

It will be understood that in describing a method effective for the generation of the tooth profiles I do not wish to limit myself to the use of chain having links and their profiles so generated. The description is to be taken as in a broad sense illustrative of a practical method of generating such profiles.

In the claims I have referred to a chain approaching or and receding from the sprocket on a line substantially tangential to the pitch circle. It will be understood of course that I do no wish to be limited to a chain which inevitably and invariably conforms geometrically to this path. Experience shows that if the chain approaches or departs on a line much to one side of this tangent then lateral vibration of the chain takes place with consequent noise and wear and decrease in efficiency. My chain approaches and recedes from the sprocket on a line near enough to the tangent line so that the lateral displacement and vibration and noise is reduced to a minimum. It is understood that the line of the chain is the line passing through the centers of the successive link pivots.

I claim:

1. In combination, a sprocket, and a chain comprising a plurality of articulated toothed links adapted for operative engagement with the sprocket teeth, the opposed working surfaces of the teeth of chain and sprocket being conjugate one to the other.

2. In combination, a sprocket, and a chain comprising a plurality of articulate toothed links adapted for operative engagement with the sprocket teeth, the opposed working surfaces of the teeth of chain and sprocket being conjugate one to the other, throughout their entire engaging range.

3. In a toothed chain and sprocket drive, a sprocket, and a chain including a plurality of links having teeth adapted for operative engagement with the sprocket teeth, the teeth of one of the elements of said drive having working surfaces whose profiles are generated by the teeth of the other of said elements, the engaging working surfaces of chain and sprocket teeth being conjugate.

4. In a toothed chain and sprocket drive, a sprocket, and a chain including a plurality of links having teeth adapted for operative engagement with the sprocket teeth, and having working surfaces substantially of the profile generated by the sprocket teeth, the working surfaces of the chain teeth being conjugate to the opposed working surfaces of the sprocket teeth.

5. In a toothed chain and sprocket drive, a sprocket, and a chain including a plurality of links having teeth adapted for operative engagement with the sprocket teeth, each tooth of said chain contacting on one working surface only with a sprocket tooth, the opposed working surfaces of said chain and sprocket teeth being conjugate.

6. As a new article of manufacture, a chain link adapted for use with a sprocket, there being a tooth at each end of the link, each tooth having a working surface generated for conjugate relationship with sprocket teeth.

7. As a new article of manufacture, a chain link adaptable for use with a sprocket, there being a tooth at each end of the link, each tooth having a working surface generated for conjugate relationship with sprocket teeth, the generated working surfaces of the two teeth being on opposite sides of the teeth.

8. As a new article of manufacture, a chain link adaptable for use with a sprocket, there being a tooth at each end of the link, each tooth having a working surface generated for conjugate relationship with sprocket teeth, the generated working surfaces of the teeth being on the inside faces of the teeth.

9. In combination, a sprocket, and a chain having teeth adapted for operative engagement wtih the sprocket teeth, the teeth of the chain having sprocket tooth engaging surfaces, generated for conjugate relationship with sprocket teeth.

10. In combination, a sprocket, and a chain having teeth adapted for operative engagement with the sprocket teeth, the chain teeth engaging the sprocket teeth upon profiles generated for conjugate relationship with sprocket teeth.

11. In a toothed chain and sprocket drive, a sprocket, and a chain including a plurality of links, each link having two teeth of the same effective contour with respect to the teeth of the sprocket, and adapted for operative contact with the sprocket teeth, each link tooth, when in operative engagement with the sprocket, contacting on one working surface only with a sprocket tooth, the working surfaces of chain and sprocket teeth being conjugate.

12. In combination, a sprocket and a chain having teeth adapted for operative engagement with the sprocket teeth, the chain comprising a plurality of links, there being a plurality of teeth on each link, the opposed working surfaces of adjacent teeth being conjugate to the working surfaces of the sprocket tooth which projects between such opposed surfaces.

13. In combination, a sprocket and a chain having teeth adapted for operative engagement with the sprocket teeth, the opposed working surfaces of adjacent teeth being conjugate to the working surfaces of the sprocket tooth which enters between such opposed surfaces, the working contours of the link teeth being generated by the sprocket teeth, but being spaced apart, by a distance greater than the distance normal to generation.

14. In combination, a sprocket and a chain having teeth adapted for operative engagement with the sprocket teeth, the opposed working surfaces of the teeth of chain and sprocket being conjugate and adapted to maintain the chain in a straight line substantially tangential to the pitch circle as the chain enters engagement with the sprocket.

15. In a toothed chain and sprocket drive, a sprocket, and a chain including a plurality of links having teeth adapted for operative engagement with the sprocket teeth, the chain teeth having progressively rolling and sliding action on the working surfaces of the sprocket teeth, the chain having constant velocity entering and leaving the sprocket for any given constant angular velocity of the sprocket.

16. In combination a plurality of sprockets and an endless chain traveling about them comprising a plurality of articulated toothed links adapted for operative engagement with the sprocket teeth, the opposed working surfaces of the teeth of chain and sprockets being conjugate one to the other as the chain winds onto and off of each of said sprockets.

WILLIAM F. BRANDT.